(12) United States Patent
Aegerter

(10) Patent No.: US 11,913,493 B2
(45) Date of Patent: Feb. 27, 2024

(54) JOINT DEVICE

(71) Applicant: Festo SE & Co. KG, Esslingen (DE)

(72) Inventor: Markus Aegerter, Altbach (DE)

(73) Assignee: Festo SE & Co. KG, Esslingen (DE)

( * ) Notice: Subject to any disclaimer, the term of this patent is extended or adjusted under 35 U.S.C. 154(b) by 251 days.

(21) Appl. No.: 17/603,526

(22) PCT Filed: Jan. 13, 2020

(86) PCT No.: PCT/EP2020/050662
§ 371 (c)(1),
(2) Date: Oct. 13, 2021

(87) PCT Pub. No.: WO2021/063544
PCT Pub. Date: Apr. 8, 2021

(65) Prior Publication Data
US 2022/0205476 A1 Jun. 30, 2022

(30) Foreign Application Priority Data
Oct. 2, 2019 (DE) .................. 10 2019 215 213.9

(51) Int. Cl.
*B60R 1/072* (2006.01)
*F16C 11/06* (2006.01)

(52) U.S. Cl.
CPC .................. *F16C 11/0604* (2013.01)

(58) Field of Classification Search
CPC ........ B60R 1/06; B60R 1/072; B25J 17/0258; B25J 9/102; F16C 11/0604
See application file for complete search history.

(56) References Cited

U.S. PATENT DOCUMENTS

| | | | |
|---|---|---|---|
| 5,042,932 A * | 8/1991 | Pent ........................ | B60R 1/072 359/877 |
| 5,533,418 A * | 7/1996 | Wu ........................ | B25J 17/0258 901/29 |
| 6,174,062 B1 * | 1/2001 | Schillegger ............. | B60R 1/072 359/872 |
| 6,341,536 B1 * | 1/2002 | Guttenberger .......... | B60R 1/072 74/502.1 |
| 6,565,221 B2 * | 5/2003 | Guttenberger ............ | B60R 1/07 359/872 |
| 6,652,108 B1 * | 11/2003 | Schillegger ............. | B60R 1/072 359/876 |

(Continued)

FOREIGN PATENT DOCUMENTS

| | | |
|---|---|---|
| DE | 102009045290 | 4/2011 |
| DE | 102009045290 A1 | 4/2011 |

(Continued)

*Primary Examiner* — Daniel J Wiley
(74) *Attorney, Agent, or Firm* — Hoffmann & Baron, LLP

(57) ABSTRACT

A joint device (1), which has a second joint body (3), which second joint body is pivotably mounted in a ball socket (9) of a first joint body (12) by means of a joint ball (8). The joint ball (8) is a hollow ball and has, on its inner peripheral surface (23), output teeth (33), with which, in the ball interior (25), the input gears (55, 56) of two drive units (4, 5) rotatably mounted on the first joint body (2) are in tooth engagement. By selective rotation of one or both drive units (4, 5), the second joint body (3) can be driven to perform a working pivoting movement (6) relative to the first joint body (2).

21 Claims, 5 Drawing Sheets

(56) References Cited

U.S. PATENT DOCUMENTS

| | | | | |
|---|---|---|---|---|
| 6,971,757 B2* | 12/2005 | Ro | ............... | B60R 1/072 |
| | | | | 359/872 |
| 10,890,209 B2* | 1/2021 | Arginteanu | ............ | F16H 19/001 |
| 11,254,017 B1* | 2/2022 | Liu | ............... | F16H 19/08 |
| 11,268,569 B1* | 3/2022 | Hu | ............... | F16C 11/106 |
| 2016/0264055 A1* | 9/2016 | Chong | ............... | B60R 1/072 |

FOREIGN PATENT DOCUMENTS

| | | |
|---|---|---|
| DE | 102010013617 | 10/2011 |
| DE | 102010013617 A1 | 10/2011 |
| WO | 1998/031565 | 7/1998 |
| WO | WO 1998/031565 | 7/1998 |
| WO | 2016/023568 A1 | 2/2016 |
| WO | WO 2016/023568 | 2/2016 |

\* cited by examiner

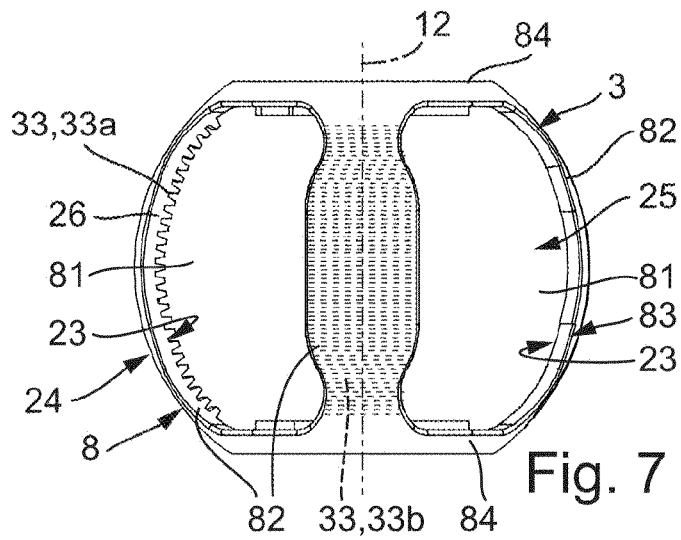
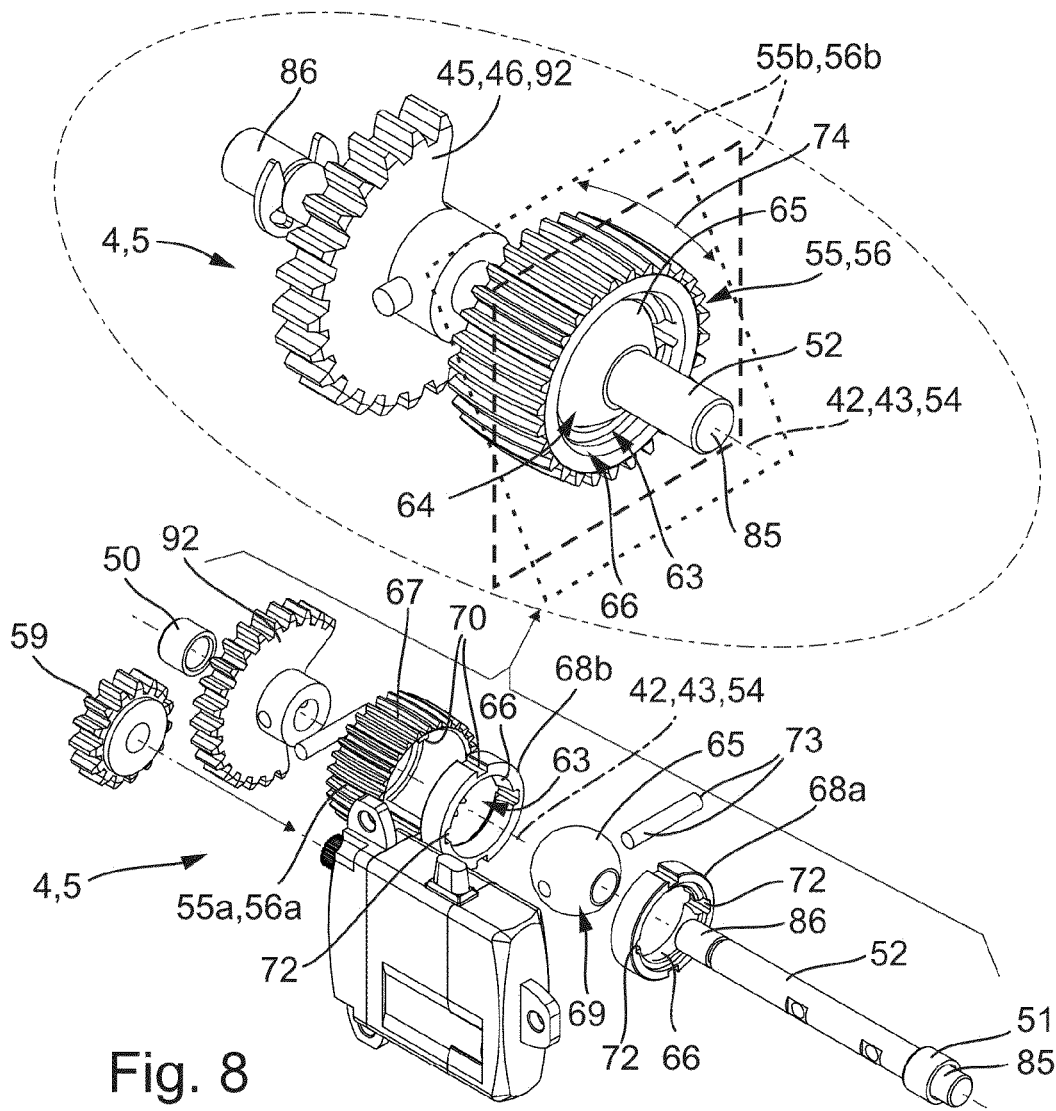

JOINT DEVICE

This is a National Stage application based on International Application No. PCT/EP2020/050662, filed on Jan. 13, 2020, which claims priority to DE 102019215213.9, filed Oct. 2, 2019.

BACKGROUND OF THE INVENTION

The invention relates to a joint device, with a first joint body and with a second joint body which is pivotable about a pivoting centre with respect to the first joint body and is positionable in different working pivoting positions whilst carrying out a working pivoting movement,
  wherein the first joint body defines a ball socket and the second joint body comprises a joint ball, wherein the joint ball is rotatably mounted in the ball socket about the pivoting centre for permitting the working pivoting movement of the first joint body and wherein the second joint body has an imaginary main axis which intersects the pivoting centre in each working pivoting position,
  wherein two rotatable first and second drive units are arranged on the first joint body, wherein the first drive unit can be driven into a first drive rotation movement about a first rotation axis by way of introducing a drive force into a first actuation section and wherein the second drive unit can be driven into a second drive rotation movement about a second rotation axis which is aligned at an angle with respect to the first rotation axis, by way of introducing a drive force into a second actuation section,
  wherein the first drive unit comprises a first drive gearwheel with a first drive gear rim which lies in a first gear rim plane which extends transversely to the first rotation axis and wherein the second drive unit comprises a second drive gearwheel with a second drive gear rim which lies in a second gear rim plane which extends transversely to the second rotation axis,
  wherein the joint ball of the second joint body comprises a driven toothing, with which the drive gear rims of the drive gearwheels of the two drive units are in toothing engagement, in order to permit a force transmission which causes the working pivoting movement.

A joint device which is constructed essentially accordingly to the aforementioned basic principles is known from DE 10 2009 045 290 A1 and there is designed as a tumbling ball joint which comprises a ball pin which is rotatable about the longitudinal axis of a housing. A ball shell, in which the ball pin is mounted with a joint ball, is formed in the housing. The ball pin has a longitudinal axis which is aligned obliquely with respect to the longitudinal axis of the housing. A gearwheel plate, with which two bevel gearwheels are engaged, with which bevel gearwheels furthermore a further gearwheel plate meshes, is formed on the joint ball. The further gearwheel plate can be driven into rotation, in order to introduce a torque into the ball pin via the two bevel gearwheels, the result of which being that the joint ball is rotated and the ball pin executes a tumbling movement.

A joint device which is known from WO 2016/023568 A1 serves for the articulated connection of two device parts. A particularity of this known joint device lies in the fact that the second joint body is mounted with a ball head in the ball socket of the first joint body in a contact-free manner. A superconductor is used for achieving the contact-free mounting.

Joint devices are often applied in robot technology. An example of this is given in DE 10 2010 013 617 B4. There, a joint device is integrated for example into a robot arm, in order to connect device parts in the form of second arm sections of the robot arm to one another in an articulated manner. The known joint device further comprises a drive unit, by way of which the two joint bodies can be driven into a relative rotation movement.

SUMMARY OF THE INVENTION

It is the object of the invention to provide a joint device which is constructed in a simple and inexpensive manner and with which pivoting movements which are quite varied, between joint bodies which are articulated to one another, can be realised.

Given a joint device of the initially mentioned type, this object is achieved in that the joint ball is designed as a hollow ball which encompasses a ball interior and which has a concavely curved inner peripheral surface, on which the driven toothing is formed as an inner toothing, wherein the two drive gearwheels are in toothing engagement with the driven toothing in the ball interior and wherein the two drive units can be driven independently of one another individually or simultaneously into their respective drive rotation moment for creating the working pivoting movement of the second joint body.

The joint device according to the invention permits an extremely varied active pivoting and positioning of the second joint body which is pivotably mounted on a first joint body. A drive force can be introduced into each of the two drive units, in order to create a working pivoting movement of the second joint body by way of the interaction of the drive gearwheels with the driven toothing of the joint ball. Each drive unit by way of the interaction of its drive gearwheel with the driven toothing of the joint ball can create a pivoting moment of the second joint body relative to the first joint body, said pivoting movement being independent of a pivoting moment which is created by the respective other drive unit. With regard to a pivoting movement which is created by a single drive unit, this is directly the working pivoting movement if this mentioned drive unit is actuated singularly without simultaneously also actuating the other drive unit. By way of the simultaneous rotation actuation of both drive units, a working pivoting movement of the second joint body can be created, said working pivoting movement being composed of two pivoting movements which are each created by one of the two drive units and which simultaneously superimpose. The two drive units can be rotationally actuated in a temporally successive or simultaneous manner. The two drive units can furthermore be selectively actuated successively or simultaneously at different or equal rotation speeds and/or with different or equal rotation directions, in order to produce a desired working pivoting movement. The driven toothing which cooperates with the drive gearwheels is situated in the inside of the joint ball which is designed as hollow ball and there is designed as an inner toothing on a concavely curved inner peripheral surface of the joint ball. The positive toothing engagement between two drive gearwheels and the driven toothing takes place in the ball interior of the joint ball which is peripherally delimited by the hollow ball, so that a space-saving and compact arrangement results. The positive toothing engagement effect a slip-free force transmission, which permits extremely precise pivoting movements and positionings of the second joint body.

The joint device can be used in any technical applications, concerning which two device parts are to be connected to one another in an articulated manner, are to be driven into a relative pivoting movement and if necessary are to be positioned at different relative pivoting positions. A preferred case of application is robot technology, wherein the joint device for example is integrated once or several times into a robot and in particular into a robot arm which comprises robot components which are pivotable relative to one another.

Advantageous further developments of the invention are defined in the dependent claims.

The first joint body expediently has a longitudinal axis which just as the main axis of the second joint body intersects the pivoting centre at every rotative relative position which is assumed between the two joint bodies. In this context, given the working pivoting movement, it is advantageous if the second joint body can be pivoted with respect to the first joint body in a manner such that the angle which is enclosed between the main axis of the second joint body and the longitudinal axis of the first joint body changes in magnitude. In particular, there is the possibility of adjusting such working pivoting positions such that the main axis and the longitudinal axis are either aligned coaxially to one another or assume a greater or lesser inclination to one another.

It is seen as being particularly advantageous if the two drive units are arranged such that their rotation axes run at right angles to one another. In particular, by way of this, there is the possibility of pivoting the second joint body in the course of the working pivoting movement such that its main axis is pivoted about the pivoting centre within a cone-shaped working region. The cone tip of the cone-shaped working region herein coincides with the pivoting centre. The main axis can also be moved along the lateral surface of the cone-shaped working region.

The joint device with regard to kinematics is preferably designed such that the main axis of the second joint body intersects an imaginary plane independently of the respectively assumed working pivoting position, said plane being denoted as a drive plane and being spanned by the two rotation axes of the two drive units which are arranged at right angles to one another. The pivoting centre for the working pivoting movement preferably lies directly in this drive plane.

Preferably, the two drive gearwheels with regard to size are matched to the joint ball which is designed as a hollow ball, in a manner such that they are each arranged in their entirety within the ball interior. In comparison to an embodiment concerning which the drive gearwheels project regionally out of the hollow ball, this permits particularly compact dimensions and a reliable shielding of the drive gear rims from external influences. The two drive gearwheels expediently have the same pitch diameter.

Expediently, each of the two drive units has a drive shaft which passes through the assigned drive gear wheel. The longitudinal axis of each drive shaft coincides with the rotation axis of the assigned drive unit. Each drive shaft is coupled to the assigned drive gearwheel in a manner permitting the torque transmission. Preferably, each drive gearwheel is pivotably mounted on the assigned drive shaft via a ball joint in a manner such that its gear rim plane can assume different inclinations with respect to the rotation axis of the drive shaft, and by way of this is capable of following a driven toothing which changes its inclination on executing the working pivoting movement. In particular, each drive gearwheel is mounted on the assigned drive shaft in a pivotably movable manner comparable to a swash plate. A low-wear and stress-free force transmission between the drive units and the ball joint is ensured by this movability of the drive gearwheel.

Expediently, with regard to each of the two drive units, the drive shaft is pivotably mounted via a spherical bearing section with a spherical outer bearing surface, on which bearing section the drive gearwheel is pivotably mounted with a concave inner bearing surface which is shaped in the manner of a ball zone. In this manner, the drive gearwheel can basically execute an arbitrary tumbling movement of the spherical bearing section. However, the relative movablility between the drive gearwheel and the drive shaft in the peripheral direction of the rotation axis is prevented, in order to permit a transmission of torque. For this, at least one driver groove which extends in a plane which coincides with the longitudinal axis of the drive shaft is formed in the inner bearing surface, into which driver groove a driver projection of the spherical bearing section which projects beyond the outer bearing surface engages in a slidingly movable and simultaneously also rotatable manner. By way of this, the drive gearwheel is variably pivotable relative to the drive shaft, in order to be able to adapt the momentary working pivoting position of the driven toothing which is formed on the ball head.

Preferably, the driver groove and the driver projection are present in pairs, wherein they are situated in regions which are diametrically opposite with respect to the rotation axis.

The arrangement of the driver groove and of the drive projection with respect to the drive gearwheel and the spherical bearing section can also be the other way around. In this case, at least one driver projection is situated on the drive gearwheel in a manner projecting radially inwards, whereas the driver groove which interacts therewith is formed in the outer bearing surface of the spherical bearing section.

It is expedient in particular for assisting in a simple assembly, if each drive gearwheel consists of a sleeve-like gear rim body which comprises a gear rim and of two fastening rings which are inserted into the sleeve-like gear rim body in a rotationally fixed manner from sides which are axially opposite one another. The fastenings rings are for example pressed in and/or are fastened by a welding connection. The two fastening rings are applied onto the spherical bearing section from sides which are axially opposite one another, wherein they each form a part-region of the concave inner bearing surface of the drive gearwheel.

It is expedient if a fastening interface which for an improved differentiation is denoted as a first fastening interface is formed on the first joint body, for the simple attachment of device parts, for example two robot arms, which are to be connected to one another in an articulated manner. A further fastening interface which for an improved differentiation is denoted as a second fastening interface is preferably located on a driven section of the second joint body which participates in the working pivoting movement. The fastening interfaces permit a fixed mechanical connection to an external device part. At least one and preferably each fastening interface is designed in particular for screw fastening. However, each fastening interface can also be structured differently, for example as a releasable clamping device.

The driven section of the second joint body is preferably arranged coaxially to the main axis. In particular it consists of a spherical-cap-shaped cover element of the joint ball which can comprise a central opening.

The driven section for example can also comprise a pin-like projection which is coaxial to the main axis or be formed by such a projection.

In order to define a preferred embodiment of the driven toothing, it is expedient to relate to an inner circle of the ball joint which coincides with the main axis in the parallel position with respect to this and which lies on the concavely spherically arcuate inner peripheral surface of the hollow ball joint. The hollow ball has a multitude of such inner circles which each lie in the region of the maximal diameter of the joint ball. The concave arcuate spherical inner peripheral surface of the joint ball has a circumferential direction which for a better differentiation is denoted as a main circumferential direction and which follows the circular line of such an inner circle. The driven toothing which is designed as an inner toothing has a multitude of teeth which are arranged successively in the main circumferential direction and each at right angles to this have a preferably convexly arcuate longitudinal extension which follows the curvature of the inner contour of the hollow ball.

The teeth of the driven toothing can be designed and arranged such that they extend around the main axis only over a part-circumference of the joint ball. What is essential is an arrangement to the extent that a toothing engagement of the driven toothing with the drive gear rims of the drive gearwheels of both drive units is present independently of the working pivoting position.

Preferably, the driven toothing of the joint ball has a multitude of teeth which each have a longitudinal extension which is curved in a circular-arc-shaped manner, said teeth being arranged successively in the axis direction of the main axis. In principle, these teeth can be aligned such that their height axes lie in planes which are parallel to one another and are at right angles with respect to the main axis. Particularly advantageous however is an embodiment concerning which the teeth are aligned such that their height axes and thus also their centres of curvature lie on the pivoting centre of the second joint body. In this manner, the teeth of the driven toothing can have the same arc-shaped curvature amongst one another, which ensures a particularly low-wearing interaction with the drive gearwheels.

Basically, the driven tooth can be designed as a unitary inner toothing with which both drive gearwheels are engaged. However, it is seen as being particularly expedient if the driven toothing consists of two toothing sections which are arranged offset to one another in the circumferential direction of the main axis of the second joint body and which are denoted as the first and second toothing section, wherein the first drive gearwheel is only in toothing engagement with the first toothing section and the second drive gearwheel only with the second toothing section. In this manner, the effort for providing the driven toothing can be kept very low. Sections of the inner peripheral surface of the ball joint which are not necessary for the driven toothing, if necessary can be used for other purposes.

It is seen as being particularly advantageous if the two toothing sections of the driven toothing are arranged offset to one another about an arc angle of 90 degrees with respect to the main axis of the second joint body. This is particularly the case in the context of an arrangement of the two drive units, concerning which the rotation axes of the two drive units run at right angles to one another and extend in a common plane which is denoted as a drive plane.

The hollow joint ball expediently comprises a shell-like ball wall which encompasses the ball interior. The driven toothing of the second joint body is located on the inner peripheral surface of the ball wall. In order to permit a rotational mounting of the drive units on the first joint body which encompasses the joint ball, the ball wall preferably comprises one or more wall openings. Each drive unit can be connected to the first joint body in a rotationally mounted manner through these one or more wall openings. For example, at least one drive unit can project through the at least one wall opening out of the ball interior and be rotatably mounted on the first joint body outside the joint ball. Additionally or alternatively, at least one drive unit can be rotatably mounted within the ball interior, on a constituent of the first joint body which projects into the ball interior. The rotational mounting measures if required can therefore be selectively realised within or outside the ball interior.

The ball wall preferably comprises several wall openings which are offset to one another in the circumferential direction of the main axis, wherein each drive unit extends in the ball interior between two of these several wall openings and in the region of these two wall openings is rotatably mounted on the first joint body which encompasses the joint ball, in particular, the latter being effected by way of the mounting measures which have been explained above.

It is seen as being particularly expedient if in total four wall openings which amongst one another are designed equally and which are uniformly distributed in the circumferential direction of the main axis are formed in the ball wall.

It is advantageous if at least one and preferably each drive unit projects through at least one and preferably through precisely one of the wall openings and is rotatably mounted on the first joint body outside the joint ball. This mounting measure in particular relates to that region of the actuation section, on which the introduction of force is effected for generating the respective drive rotation movement.

Furthermore, it is expedient if at least one and preferably each of the two drive units is rotatably mounted with at least one and preferably with exactly one of its axial end sections on a constituent of the first joint body which is designed as a bearing arm, wherein this bearing arm projects through one of the wall openings of the wall into the ball interior. In this context, it is particularly advantageous if both drive units are each commonly rotatably mounted with one of their two axial end sections on one and the same bearing arm of the first joint body. Preferably, the rotational mounting on the bearing arm is effected in a region of an axial end section of the respective drive unit which is opposite to the actuation section.

If the driven toothing is subdivided into two toothing sections which are distanced to one another, it is advantageous if the two toothing sections are each formed on an arched, web-like wall section of the ball wall which is arranged between two wall openings. In the case of the presence of several wall openings, the joint ball has an arrangement of wall openings and web-like wall sections, said wall openings and wall sections alternating in the circumferential direction of the main axis, wherein preferably two web-like wall sections which flank one and the same wall opening are each provided with one of the two toothing sections on their inner side.

The assembly of the joint device is assisted if the first joint body is designed in a multi-part manner. In this context, the first joint body expediently has a multi-part mounting body which encompasses the joint ball and which is fixedly held together by way of suitable fastening measures, in particular a screw connection. The mounting body has two bearing shell elements which are arranged coaxially with respect to a longitudinal axis of the first joint body which intersects the pivoting centre, and at an axial distance to one another, wherein an annular carrier element of the mounting body is integrated between these two bearing shell elements. The two bearing shell elements each define a section of the ball socket which serves for the rotational mounting of the ball joint. The carrier element carries the two drive units which are rotatably mounted on the carrier element.

The carrier element is preferably also envisaged to carry two drive devices which are operated electrically and/or by way of fluid force and which provide the drive force of the generation of drive rotation movements of the two drive units. The carrier element is preferably provided with suitable fastening interfaces for the attachment of the drive devices which belong to the joint device. These fastening interfaces are preferably arranged in the region of the radial outer periphery of the annular carrier element. Each drive device which is attached to a fastening interface, with regard to drive is connected to the actuation section of one of the two drive units, for example by way of a gearwheel gear.

The drive devices for the drive units are preferably formed by electric motors, in particular servo-motors or stepper motors. For example, the electrical drive devices can however also operate according to an electromagnetic functioning principle. A construction type of drive devices which is operated by fluid force and is basically likewise usable preferably comprises a pneumatically or hydraulically actuatable working cylinder or also at least one contraction drive which comprises a contraction tube which axially contracts on being subjected to an inner pressure. Such contraction drives are marketed by the applicant under the description "fluidic muscle" and are also denoted as pneumatic muscles.

The joint device is preferably provided with an electronic control device, onto which the drive devices are connected for the electronic control with regard to the operation. The electronic control device can control the drive devices for the desired positioning of the second joint body.

The mounting body can be simultaneously designed as a housing of the joint device. However, it is seen as being more expedient if the first joint body additionally to the mounting body comprises an outer housing which envelops this mounting body and is fastened to the mounting body. The outer housing is preferably designed in a multi-part manner and in particular comprises two housing shells which are applied onto the mounting body in the axial direction from opposite sides. The outer housing comprises at least one housing opening, through which the second joint body is accessible for the attachment of an external device part. In particular, an embodiment to the extent that the second joint body projects outwards through the housing opening of the outer housing is created.

BRIEF DESCRIPTION OF THE DRAWINGS

The invention is hereinafter explained in more detail by way of the accompanying drawing. In this are shown in.

DETAILED DESCRIPTION

Figure 1:
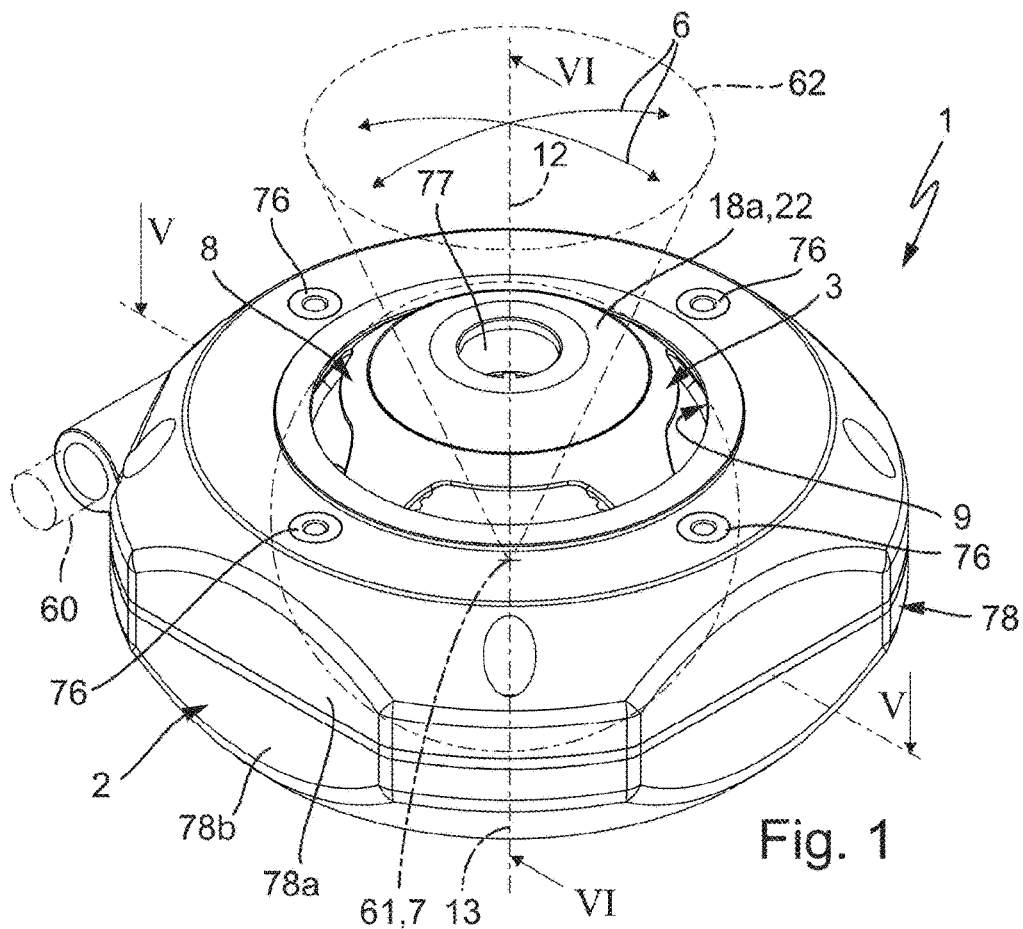
FIG. 1 an isometric representation of a preferred embodiment of the joint device according to the invention, FIG. 2 the joint device of FIG. 1 given a removed outer housing, FIG. 3 the arrangement of FIG. 2 in the removed state of one of the two bearing shell elements, FIG. 4 the arrangement of FIG. 3 from an opposite viewing direction and in the cut-open state of the ball joint, so that the toothing engagement between the drive gearwheels and the driven toothing is visible, FIG. 5 a cross section through the joint device according to the section line V-V of FIGS. 1 and 6, FIG. 6 a longitudinal section through the joint device according to section line VI-VI of FIGS. 1 and 5, FIG. 7 an individual representation of the first joint body in a lateral view with a viewing direction according to arrow VII of FIG. 3, and FIG. 8 an isometric exploded representation of a drive unit with an assigned drive device, wherein the drive unit is additionally illustrated in the put-together state in the region which is framed in a dot-dashed manner, wherein the shown design construction applies to both drive units.
Figure 2:
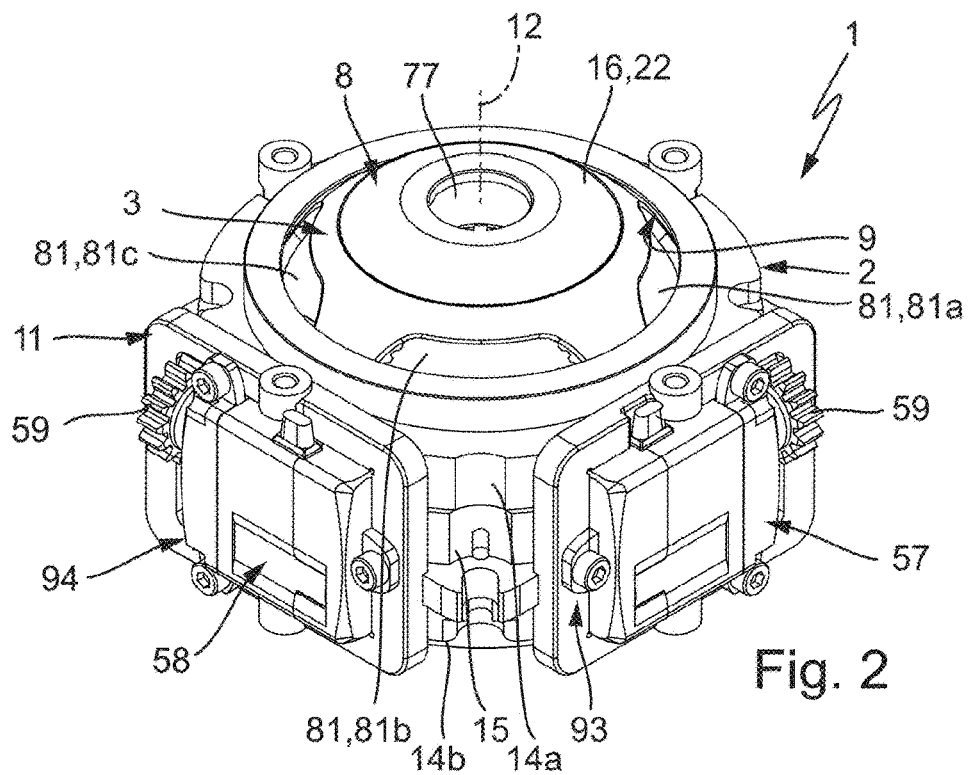
Figure 3:
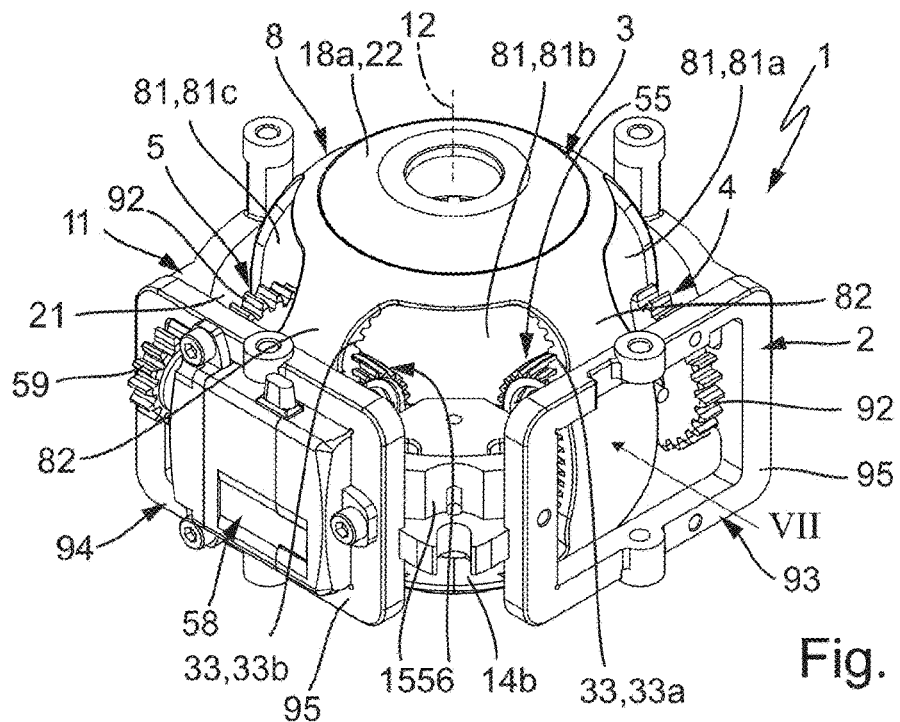

The joint device according to the invention which as indicated in its entirety with the reference numeral 1 has a first joint body 2 and a second joint body 3 which is pivotable with respect to the first joint body 2.

The joint device 1 has a first drive unit 4 and a second drive unit 5 which is separate with respect to this. Both drive units 4, 5 are arranged on the first joint body 2 in a rotatable manner. By way of its actuation, the second joint body 3 can be driven into a working pivoting movement relative 6 to the first joint body 2, said working pivoting movement being indicated by double arrows. The working pivoting movement 6 has a pivoting centre 7.

In the course of the working pivoting movement 6, the second joint body 3 can be positioned in different pivoting positions with respect to the first joint body 2 and these are denoted as working pivoting positions.

For permitting the working pivoting movement 6, the second joint body 3 has a joint ball 8 which is rotatably mounted in a ball socket 9 which is formed by the first joint body 2. The rotation point of the joint ball 8 which is stationary with respect to the first joint body 2 lies on the pivoting centre 7 which is stationary with respect to the first joint body 2.

With regard to the illustrated embodiment example, the second joint body 3 consists directly of the joint ball 8, but can however additionally comprise yet further constituents.

The second joint body 3 has an imaginary main axis 12. The main axis 12 intersects the pivoting centre 7 independently of the momentary working pivoting position of the second joint body 3. Preferably, the main axis 12 defines a longitudinal axis of the second joint body 3 which intersects the centre of the joint ball 8.

The first joint body 2 has an imaginary middle longitudinal axis 13 which intersects the pivoting centre 7. Preferably, the first joint body 2 comprises a multi-part mounting body 11 which encompasses the joint ball 5 at least in its equatorial region, said mounting body being with a first bearing shell element 14a, a second bearing shell element 14b and a carrier element 15 which carries the two drive units 4, 5 which are rotatably mounted on the carrier element 15.

Of the two bearing shell elements 14a, 14b, at least one is designed in an annular manner. Preferably and according to the embodiment example, both bearing shell elements 14a, 14b are structured in an annular manner and the carrier element 15 is also designed in an annular manner. Hence the complete mounting body 11 has a ring structure, wherein it frames the joint ball 8. The two bearing shell elements 14a, 14b and the carrier element 15 are arranged coaxially with respect to the longitudinal axis 13 of the first joint body 2, wherein the carrier element 15 is seated axially between the two bearing shell elements 14a, 14b. These three elements 14a, 14b, 15 are axially fixedly held together, for which purpose suitable fastening measures are made, for example a screw connection by way of several fastening screws or a weld connection.

At least the two bearing shell elements 14*a*, 14*b* on their inner periphery each define a section of the ball socket 9 which is denoted as a ball socket section 9*a*, 9*b*. The two ball socket sections 9*a*, 9*b* by way of example are each shaped in accordance with a ball zone. Preferably, the ball socket 9 is formed exclusively by these two ball socket sections 9*a*, 9*b*, so that it has no ball shape which is closed per se. In particular, the carrier element 15 expediently has an inner diameter which is larger than the diameter of the ball socket 9, so that it does not directly contribute to the formation of the ball socket 9.

The mounting body 11 frames a bearing body interior 21. This is preferably open axially at both sides, this in the region of both bearing shell elements 14*a*, 14*b*. The joint ball 8 is seated in this bearing body interior 21. If the length of the mounting body 11 which is measured in the axis direction of the longitudinal axis 13 is smaller than the diameter of the joint ball 8, which is the case with the illustrated embodiment example, then the joint ball 8 projects with the first and second ball-cap-shaped end sections 16, 17 which are opposite to one another out of the mounting body 11.

For example, the first ball-cap-shaped end section 16 defines a driven section 22 of the second joint body 3, on which the working pivoting movement 6 can be mechanically engaged. By way of example, the driven section 22 is arranged coaxially to the main axis 12 and is formed by a ball-cap-shaped first cover element 18*a* of the joint ball 8.

The joint device 1 is expediently provided with means which permit an external mechanical fastening of the two joint bodies 2, 3, said fastening being independent of one another. In this context, by way of example the first joint body 2 is provided with a first fastening interface 76 and the second joint body 3 with a second fastening interface 77. Both fastening interfaces 76, 77 by way of example are designed to permit a screw connection to an external device part which is not shown further, for example to a length section of a robot arm.

By way of example, the first fastening interface 76 consists of several fastening holes which are formed in the first joint body 2, whereas the second fastening interface 77 consists of a fastening hole which is formed centrally in the driven section 22. The fastening holes expediently each comprise an inner thread. It is to be understood that the fastening interfaces 76, 77 which permit a mechanical connection to external device parts can also be designed differently, in order to meet the respective demands.

The joint ball 8 is designed as a hollow ball and has a shell-like ball wall 26 which encompasses a cavity which is hereinafter denoted as a ball interior 26. The ball wall 26 has a concavely curved and expressed more precisely a spherically concavely curved inner peripheral surface 23 which faces radially inwards and on which a driven toothing 33 which is designed as an inner toothing of the joint ball is formed.

At the outside, the joint ball 8 has a convex, spherical outer peripheral surface 24 with which it is mounted in the ball socket 9 in a slidingly displaceable manner for permitting a rotation movement.

The driven toothing 33 has a multitude of teeth 34 which are arranged successively in the axis direction of the main axis 12. The axis direction of the main axis 12 is hereinafter also denoted as a main axis direction 12 for simplification.

In each case, a tooth intermediate space which has the shape of a longitudinal groove is located between teeth 34 which are consecutive in the main axis direction 12.

Figure 6:
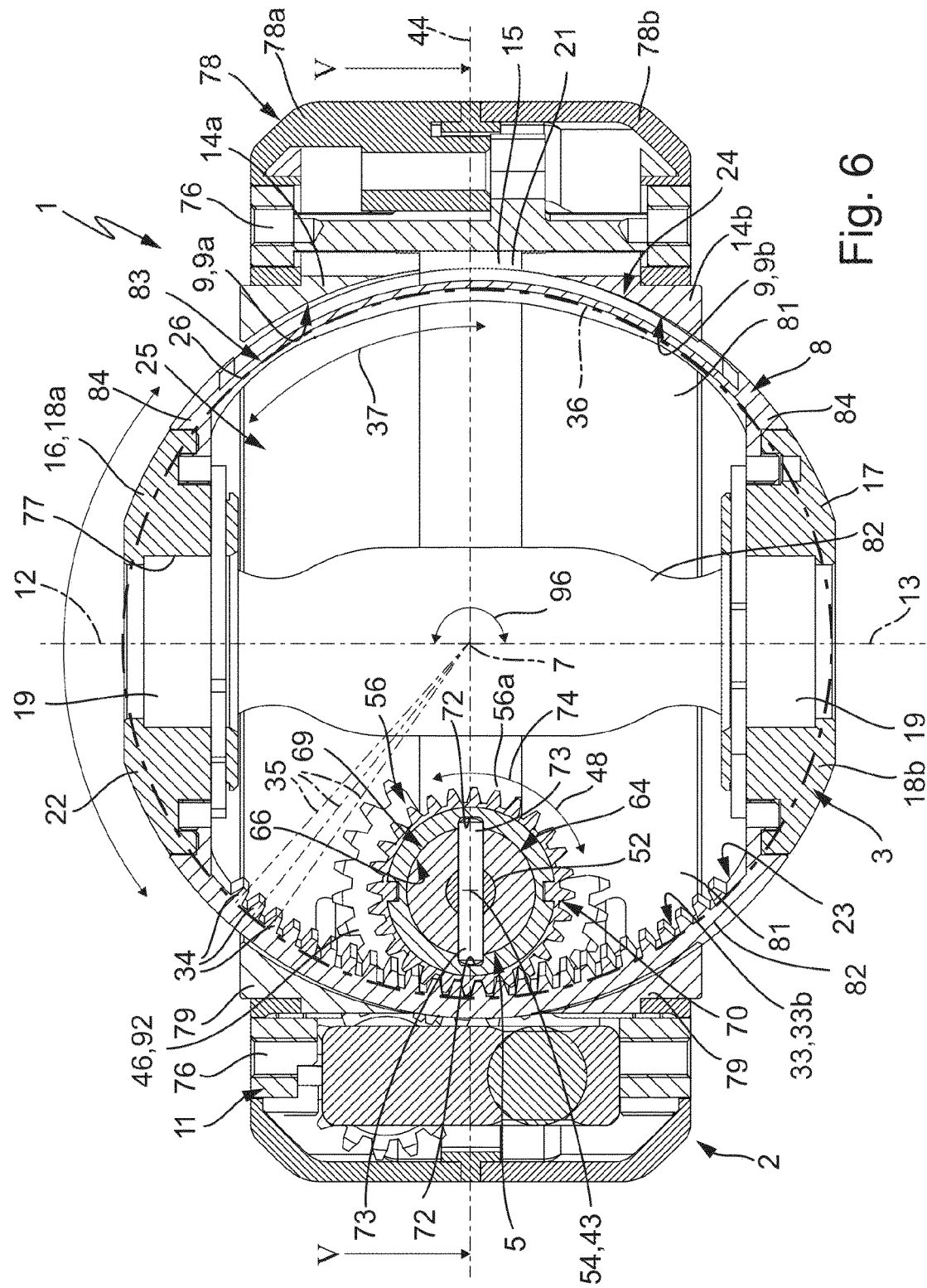

If the joint ball 8 is imaginarily sectioned in a plane, in which the main axis 12 lies, then the sectioned surface on the inner peripheral surface 23 of the ball wall 26 is delimited by a circle which is hereinafter denoted as an inner circle 36 and is drawn in FIG. 6 in a dot-dashed manner. The inner circle 36 lies parallel to the main axis 12, wherein the distance with respect to this is equal to zero, so that the main axis 12 lies on the circular surface area which is enclosed by the inner circle 36. A peripheral direction which the circular line of the inner circle 36 follows, is hereinafter denoted as a main circumferential direction 37 of the inner contour of the hollow joint ball 8. The teeth 34 and the teeth intermediate spaces which lie therebetween are formed on the inner peripheral surface 37 in a successively alternating manner in this main circumferential direction 37. Each tooth 34 and accordingly also each tooth intermediate space in a direction which is at right angles to the main circumferential direction 37 has a convexly arcuate longitudinal extension with a centre of curvature which lies in the ball interior 25. Each tooth 35 preferably has a circular-arc-shaped longitudinal shape.

Each tooth 34 has a tooth base region which lies radially at the outside with respect to the centre of the joint ball 8 and a tooth tip region which is away from this and faces the ball interior 25. Each tooth 34 has a height axis 35 which passes through the tooth base region and the tooth tip region and which defines a height direction 35 of the respective tooth 34, wherein the teeth 34 in particular are arranged and aligned such that the height axes 35 of all teeth 34 intersect the pivoting centre 7. The result of this is the fact that the centres of curvature of all of the circular-arc-shaped teeth 34 lie on this pivoting centre 7. By way of this, all teeth 34 have the same radius of curvature.

Figure 5:
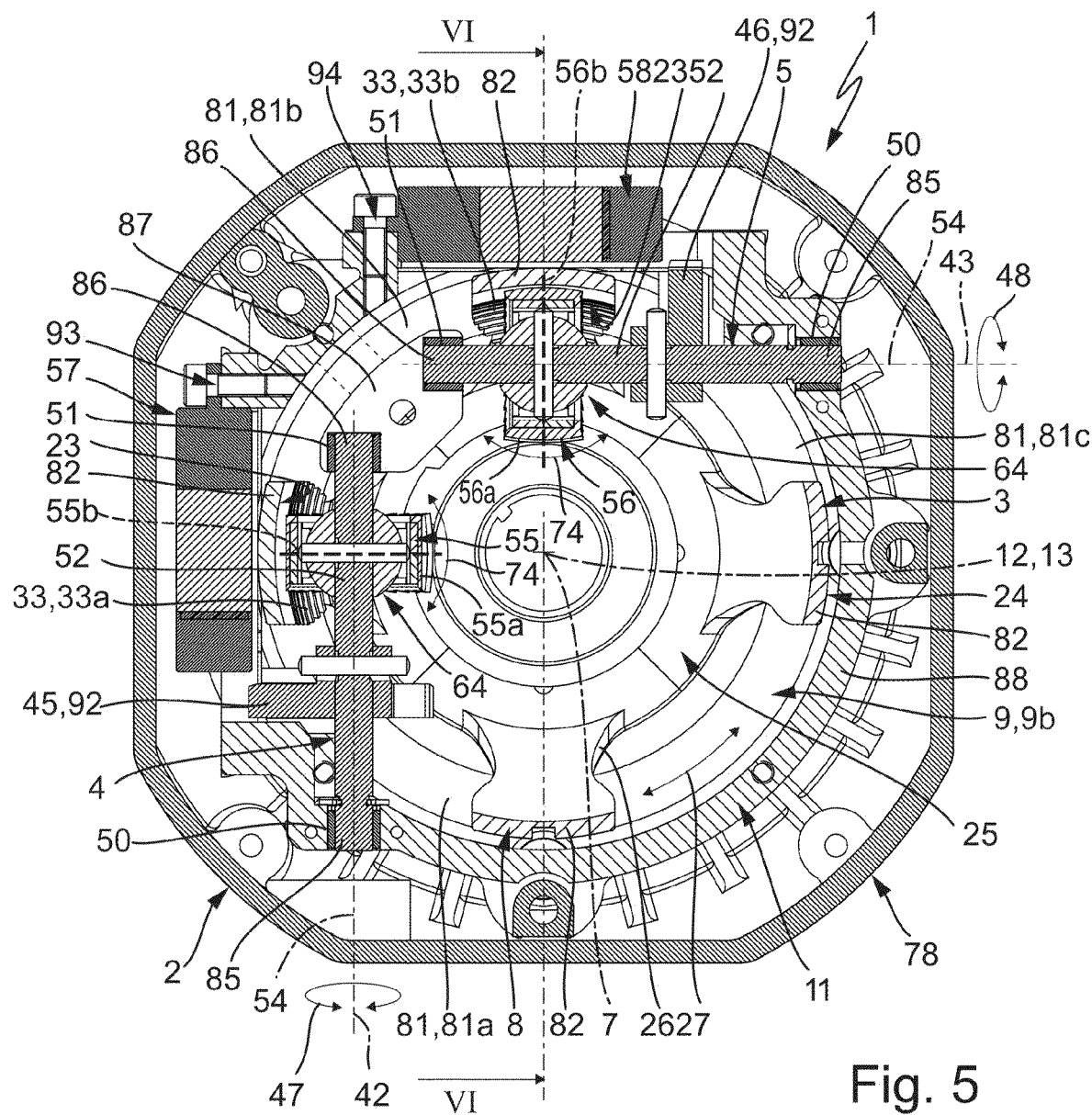

A direction annularly around the main axis 12 is hereinafter denoted as the main axis circumferential direction 27 and is indicated in FIG. 5 by a double arrow. With regard to the illustrated preferred embodiment example, the driven toothing 33 is composed of two first and second toothing sections 33*a*, 33*b* which are offset to one another in the main axis circumferential direction 27. Expressed differently, the driven toothing 33 is divided up into two separate toothing sections 33*a*, 33*b* which are arranged distanced to one another in the main axis circumferential direction 27. Preferably, the two toothing sections 33*a*, 33*b* are offset to one another about an arc angle about the main axis 12 of 90 degrees. Each toothing section 33*a*, 33*b* preferably has a strip-like, concavely curved longitudinal extension in the main axis direction 12 with teeth 34 which are arranged successively in the main axis direction 12.

The ball wall 26 is broken though at least once and preferably several times. By way of example, it has a plurality of wall openings 81 which in particular are designed in a window-like manner and are closed all around at the edge side. The wall openings 81 are arranged offset to one another in the main axis circumferential direction 27. Preferably, a regular distribution of the wall openings 81 is present, wherein the illustrated embodiment example as a whole comprises four wall openings 81 which are expediently designed equally amongst one another. Wall openings which are consecutive in the main axis circumferential 27 are each divided off from one another by way of an arcuate, web-like wall section 82 of the ball wall 26.

The two toothing sections 33*a*, 33*b* are formed on the concave inner peripheral surface 23 of one of the several web-like wall sections 82. Preferably, the two toothing sections 33a, 33b are located on two web-like wall sections 82 which are arranged consecutively in the main axis circumferential direction 27. The remaining web-like wall sections 82 are preferably designed without teeth.

Expediently, the joint ball 8 has a multi-part construction. It is preferably formed according to the embodiment example of a middle part 83, in which the wall openings 81 are formed, and of two cover elements 18a, 18b. A first cover element 18a has already been mentioned above and is seated in an end region of the joint ball 8 which faces in the main axis direction 12. The other, second cover element 18b is arranged on the middle part 83 lying opposite the first cover element 18a in the main axis direction 12. The middle part 83 axially on both sides has an annular end section 84 which is coaxial to the main axis 12 and between which the web-like wall sections 82 extend and which delimits the wall openings 81 at the sides which face the main axis direction 12. Each annular end section 84 frames an opening, into which the assigned cover element 18a, 18b is inserted. The cover parts 18a, 18b are fastened to the middle part 83, for example by way of a welding connection or a latching connection.

The two further first and second drive units 4, 5 which have already been mentioned above are mounted on the first joint body 2 in a manner in which they are rotatable independently of one another. Preferably, they are rotatably mounted in the mounting body 11 and herein possibly on the carrier element 15.

The first drive unit 4 is rotatable about a first rotation axis 42 and the second drive unit 5 is rotatable about a second rotation axis 43. These two rotation axes 42, 42 are preferably aligned at right angles to one another and together span a plane which is denoted as a drive plane 44 and which is aligned at right angles to the longitudinal axis 13 of the first joint body 12 which intersects the pivoting centre 7. This drive plane 44 is transected by the main axis 12 of the second joint body 3 independently of the working pivoting position which the second joint body 3 momentarily assumes.

The first drive unit 4 has a first actuation section 45 and the second drive unit 5 has a second actuation section 46. Each actuation section 45, 46 is expediently assigned to one of two axial end regions of the respective drive unit 4, 5 which are opposite to one another.

The two actuation sections 45, 46 permit a force introduction for producing a torque, in order to drive the first drive unit 4 into a first drive rotation movement 47 about the first rotation axis 41 and in order to drive the second drive unit 5 into a second drive rotation movement 48 about the second rotation axis 43.

The first drive unit 4 has a first drive gearwheel 55 with a first drive gear rim 55a which is arranged peripherally radially at the outside. The second drive unit 5 has a second drive gearwheel 56 with a second drive gear rim 56a which is arranged peripherally radially at the outside. The first drive gear rim 55a lies in an imaginary first gear rim plane 55b which is represented in a dashed manner, whereas the second drive gear rim 56 lies in a second gear rim plane 56b which is likewise represented in a dashed manner. Both gear rim planes 55a, 55b extend transversely to the respectively assigned first and second rotation axis 41, 43.

The two drive gearwheels 55, 56 are connected to the assigned first or second actuation section 45, 46 in a torque-transmitting manner. A rotation movement which is created by the introduction of force into one of the actuation sections 45, 46 therefore directly results in a corresponding rotation movement of the assigned drive gearwheel 55, 56.

Both drive gearwheels 55, 56 are in constant toothing engagement with the driven toothing 33 of the second joint body 3 via their drive gear rims 55a, 56a. This permits the creation of the working pivoting movement 6 of the second joint body 3 by way of rotationally driving the two drive gearwheels 55, 56.

Both drive gearwheels 55 at least partly are situated in the ball interior 25 and there are in toothing engagement with the driven toothing 23 which is formed on the inner peripheral surface 23 of the joint ball 8. Preferably, and according to the illustrated embodiment example, both drive gearwheels 55, 56 are received as a whole in a ball interior 25, wherein they do not project out of the joint ball 8.

The first drive gearwheel 55 which belongs to the first drive unit 4 is only in engagement with the first toothing section 33a, wherein the second drive gearwheel 56 which belongs to the second drive unit 5 is only in engagement with the second toothing section 33b.

If the main axis 12 and the longitudinal axis 13 are aligned coaxially to one another, the two gear rim planes 55b, 56b run at right angles to one another and at the same time parallel to the longitudinal axis 13 as well as to the main axis 12.

Each drive unit 4, 5 has a drive shaft 52 with a longitudinal axis 454. The drive shaft 52 is rotatably mounted on the first joint body 2 by way of a first rotary bearing 50 and a second rotary bearing 41 which is axially distanced with respect to this, wherein the mounting is preferably effected on the carrier element 15. Concerning each drive unit 4, 5, the longitudinal axis 54 coincides with the assigned rotation axis 42, 43.

Preferably, the two rotary bearings 50, 51 are situated at first and second axial end sections 85, 86 of the respective drive shaft 52 which are opposite one another. By way of this, a stable transverse supporting of the drive shaft 52 with the possibility of being able to transmit very high torques results.

The first drive gearwheel 55 is arranged on the drive shaft 52 of the first drive unit 4 in a rotationally fixed manner. The second drive gearwheel 56 is arranged on the drive shaft 52 of the second drive unit 5 in a rotationally fixed manner. The assigned drive shaft 52 axially passes through both drive gearwheels 55, 56, so that each drive gearwheel 55, 56 is arranged between the two rotary bearings 50, 51 which rotatably support the drive shaft 52

As is particularly evident from FIG. 5, some of the wall openings 81 of the ball wall 26 have the task of permitting a rotational mounting of the drive units 4, 5 on the first joint body 2 which encompasses the joint ball 8 at the outside, irrespectively of the fact that the drive gearwheels 55, 56 are arranged in the ball interior 25.

Each drive unit 4, 5 and in particular each drive shaft 52 extends in the ball interior 25 between two of the wall openings 81 and is rotatably mounted on the carrier element 15 in the region of each of these two wall openings 81.

Preferably, in total three wall openings 81 which are arranged consecutively in the main axis circumferential direction 27 participate in permitting the rotation mounting of both drive units 4, 5. Of the first drive unit 4, the first axial end section 85 is rotatably mounted in the region of a first wall opening 81 and the second axial end section 86 in the region of a second wall opening 81, 81b which is directly adjacent to the first wall opening 81a in the main axis circumferential direction 27. A rotational mounting of the second axial end section 86 of the second drive unit 5 is likewise effected in the region of the second wall opening 81b, whereas the first axial end section 85 of the second drive unit 5 is rotatably mounted in the region of a third wall opening 81, 81c which is subsequent to the second wall opening 81b.

The drive shaft 52 of the first drive unit 4 projects through the first wall opening 81a and is rotatably mounted on the carrier element 16 outside the joint ball 8 via the assigned first rotary bearing 50. A comparable external rotational mounting is effected with respect to the drive shaft 52 of the second drive unit 5 which with its first axial end section 85 passes through the third wall opening 81c.

The second axial end section 86 of both drive shafts 52 is rotatably mounted within the joint ball 8 in the region of the second wall opening 81b and specifically on a bearing arm 87 which projects through the second wall opening 81b into the ball interior 25 and which is a constituent of the carrier element 15. The carrier element 15 has a ring section 88 which is seated directly between the two bearing shell elements 14a, 14b and on which the bearing arm 87 is attached, in particular in a single-piece manner, such that it projects radially inwards in the direction of the pivoting centre 7, wherein it passes through the second wall opening 81b from the outside and freely ends in the ball interior 25.

Differing from the illustrated embodiment example, there is of course also the possibility of mounting the drive units 4, 5 on both axial end sections 85, 86 in each case outside or in each case within the joint ball 8, by way of one of the mounting manners which have been outlined.

Furthermore there is also the possibility which has not been illustrated, of rotatably mounting each drive unit 4, 5 only at one of its axial end regions and of permitting it to end freely and in a non-supported manner at its other end region. In this case, a single wall opening 81 per drive unit 4, 5 is sufficient for permitting the rotational mounting.

The cross section of the wall openings 81 is dimensioned adequately large, in order to permit working pivoting movement 6 of the first joint body 2 without hindrance.

The actuation section 45, 46 which is designed for introducing a drive force which creates the drive rotation movement 47, 48 is preferably assigned to the first axial end section 85 of the drive shaft 52 with regard to both the two drive units 4, 5. By way of example, it comprises a gearwheel 92 which is fastened to and in particular on the drive shaft 52 in a rotationally fixed manner and which for a better differentiation is denoted as an input gearwheel 92. The input gearwheel 92 is preferably placed between the two rotation bearings 50, 51 in a manner such that in the case of the first drive unit 4 it is arranged in the region of the first wall opening 81 and in the case of the second drive unit 5 it is arranged in the region of the third wall opening 81c. Hence it is accessible for a force introduction through the respective wall opening 81a, 81b, 81c.

In order to permit relatively large pivoting angles for the working pivoting movement 6 in a collision free manner, it is advantageous if the input gearwheel 92 is designed in a manner such that it only extends over a part-circumference of the longitudinal axis 54. Compared to a gearwheel which is contoured in a circularly round manner, the input gearwheel 92 merely has the shape of a circle sector whose central angle is preferably between 180 degrees and 270 degrees. The input gearwheel 92 is installed such that the non-toothed region faces the inside of the ball interior 25. In this manner, there is relatively much space in the ball interior 25 if necessary for other installed parts or for leading through energy transmission means such as electrical cables and/or pressurised air tubes.

The joint device 1 expediently comprises a first drive device 57 which engages on the first actuation section 45 in a force-transmitting manner, and it further comprises a second drive device 85 which engages on the second actuation section 46 in a force transmitting manner.

Each drive shaft 52 and thus each drive unit 4, 5 can be selectively driven by the drive devices 57, 58 in the clockwise direction or in the anti-clockwise direction to the assigned first or second drive rotation movement 47, 48.

The two drive devices 57, 58 are arranged on the first joint body 2, wherein by way of example they are fastened to the carrier element 15. The carrier element 15 hence not only carries the two drive units 4, 5 but also the two drive devices 57, 58.

A fastening interface 93, 94 is formed on the carrier element 15 for the attachment of each drive device 57, 58. One of the two drive devices 57, 58 is preferably fixed on each of these two fastening interfaces 93, 94 in a releasable manner, in particular by way of fastening screws. Each fastening interface 93, 94 is preferably formed on the carrier element 15 at the outside and for example according to the illustrate embodiment example comprises a fastening frame 95. Each fastening interface 93, 94 is expediently arranged in the region of one of the two actuation sections 45, 46 which by way of example are designed as an input gearwheel 92.

The drive devices 57, 58 are preferably electrical drive devices 57, 58 which concerning the illustrated embodiment example are based on an electromotoric drive principle. Here, it is particularly the case of electrical servomotors or stepper motors. Each of the electrical drive devices at the output side has a gearwheel 59 which can be rotationally driven in both directions and which is in toothing engagement with the input gearwheel 92, in order to be able to transmit the drive force which is necessary for the generation of the drive rotation movement 47, 48, in a slip-free manner. Electrical energy and/or control signals which are necessary for the electrical actuation can be fed through an electrical cable 60 which is indicated in FIG. 1 in a dot-dashed manner.

Alternatively, the drive devices can be based for example on an electromagnetic drive principle or on a drive principle which is actuated by fluid force.

Preferably, the joint device is yet also provided with an electronic control device in a manner which is not illustrated, to which control device the drive devices 57, 58 are connected, in order to be able to obtain electrical control signals which control their operation.

Differing from the illustrated embodiment example, the actuation sections 45, 46 can also be designed for the manual introduction of force. For example, each actuation section 45, 46 can comprise a hand knob which is rotatable by hand.

By way of a suitable electrical control of the drive devices 57, 58 or also by way of the aforementioned manual introduction of force, there is the possibility of driving the two drive units 4, 5 into their respective drive rotation movement 47, 48 individually or simultaneously, independently of one another, for creating the working pivoting movement of the second joint body 3. This selective rotation of the two drive units 4, 5 includes only one of the two drive units 4 or 5 being rotated at a certain point in time, whilst the other is at a standstill, or both drive units 4, 5 being simultaneously rotated. Furthermore, the selective rotating includes a selective rotating in the clockwise direction or in the anticlockwise direction and/or likewise a rotating at rotation speeds which are different from one another.

On rotating a drive unit 4, 5, its drive gearwheel 55, 56 rotates accordingly, wherein its toothing engagement with the assigned toothing section 33a, 33b leads to a torque being introduced into the joint ball 8, said torque resulting in a pivoting of the second joint body 3 about the pivoting centre 7. The toothing section 33a, 33b herein runs past the momentarily rotating drive gearwheel 55, 56 which rolls on the toothing section 33a, 33b.

Figure 4:
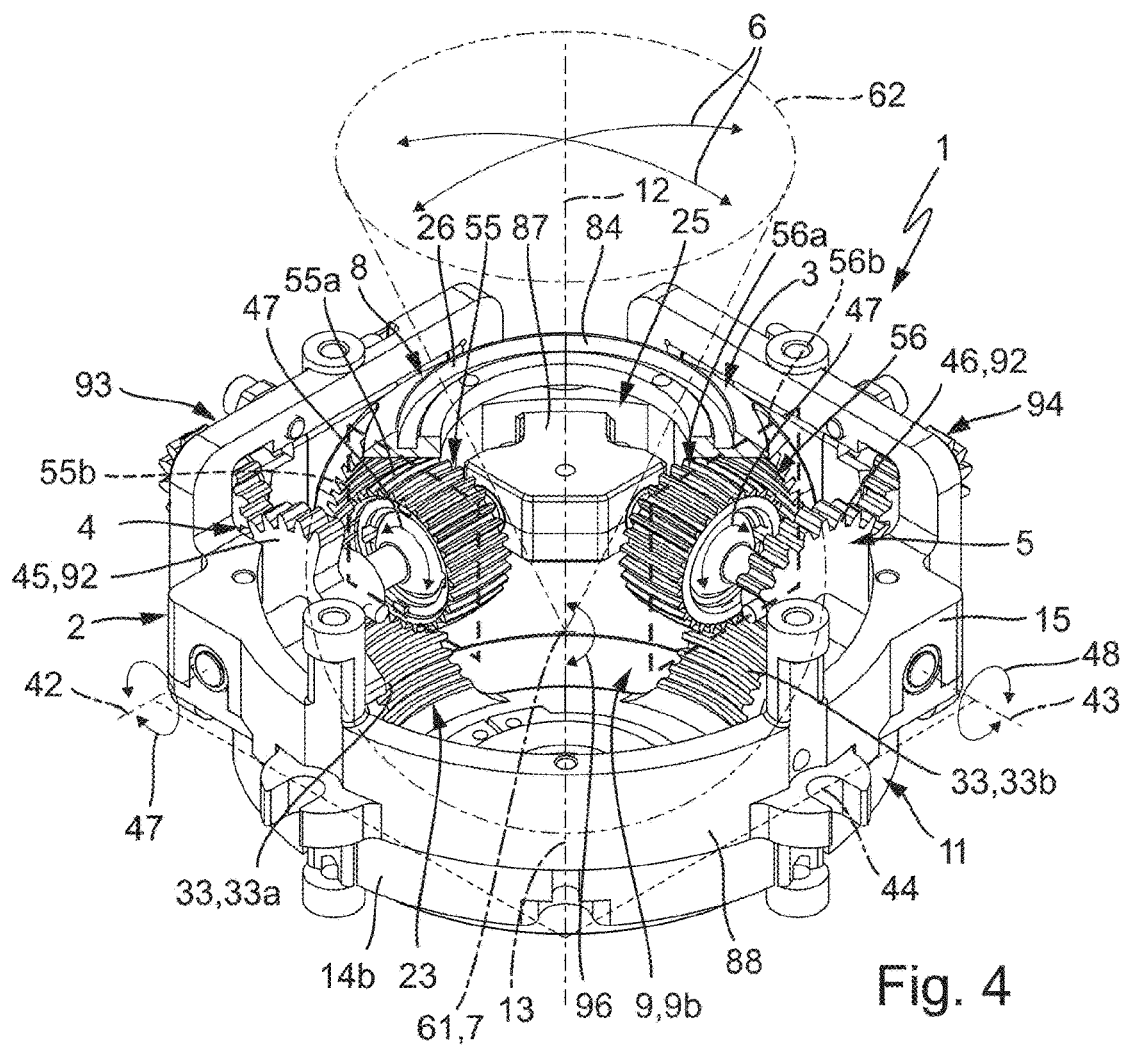

By way of a rotation of the two drive units 4, 5 which is accordingly matched to one another, the working pivoting movement 6 can be generated such that the main axis 12 of the second joint body 3 is pivoted about the pivoting centre 7 within a cone-shaped working region 62 which is indicated in a dot-dashed manner in FIGS. 1 and 4. The cone tip 61 of the cone-shaped working region coincides with the pivoting centre 7. The drive rotation movements 47, 48 can be stopped at any time, which by way of example is effected by way of a suitable control of the drive devices 47, 48, so that the second joint body 3 remains standing in the momentarily assumed working pivoting position and is consequently positioned accordingly.

The pivoting movability within the cone-shaped working region 62 preferably includes those pivoting movements, concerning which the angle 96 which is enclosed between the main axis 12 of the second joint body 3 and the longitudinal axis 13 of the first joint body 2 and which is denoted as a working angle 69 changes. This working angle 96 is 180 degrees given a coaxial alignment of the main axis 12 and the longitudinal axis 13 and can be changed by way of actuations of the drive unit 4, 5 which are matched to one another. The pivotability within the cone-shaped working region 62 in particular also includes the mains axis 12 which is inclined with respect to the longitudinal axis 13 rotating about the pivoting centre 7 without changing the working angle 13, wherein given a maximal working angle 96 it moves along the lateral surface of the cone-shaped working region 62.

Preferably, the drive gearwheels 55, 56 are mounted such that they are pivotable with respect to the first joint body 2 in a manner such that their gear rim planes 55b, 56b can assume different inclinations with respect to the assigned rotation axis 42, 43. By way of this, the drive gearwheels 55, 56 are in the position of adapting themselves automatically in their alignment to the momentary inclination of the driven toothing 33. One can imagine the mounting comparable to the mounting of a swash plate. The automatic adaptability of the toothings which engage into one another reduces the wear and prevents jamming. Furthermore, in this manner one can constantly ensure a relative large contact surface between the tooth flanks which bear on one another, which minimises the specific loading.

In order to permit the aforementioned inclination adjustment, it is advantageous if each drive gearwheel 55, 56 has a central axial opening 63, through which the assigned drive shaft 52 passes. For permitting the mentioned inclination adaptation, each drive gearwheel 55, 56 is mounted on the assigned drive shaft 52 via a ball joint 64.

Expediently, for forming each ball joint 64, each drive shaft 52 is provided with a spherical bearing section 65, on which the drive gearwheel 55, 56 is pivotably mounted with a concave inner bearing surface 66 which is designed in the manner of a ball zone. The spherical bearing section 65 has a convex spherical outer bearing surface 69 which is shaped complementarily to the inner bearing surface 66.

For assisting in a simple assembly, each drive gearwheel 55, 56 expediently consists of a sleeve-like gear rim body 67 which comprises the drive gear rim 55a, 56a and of two fastening rings 68a, 68b which are inserted into this sleeve-like gear rim body 67 in a rotationally fixed manner from axially opposite sides and which each form a part-region of the concave inner bearings surface 66. On assembling the drive unit 4, 5, firstly the gear rim body 67 is placed onto the spherical bearing section 65, whereupon the two fastening rings 68a, 68b are inserted into the gear rim body 67 from opposite sides such that the part-regions of the inner bearing surface 66 which are formed on them come to bear on the outer bearing surface 69.

Expediently, a positively acting rotation lock device 70 is present, said rotation lock device ensuring a fixation between the fastening rings 68a, 68b and the gear rim body 67 in a non-rotatable manner relative to one another. The fastening rings 68a, 68b are preferably pressed into the gear rim body 67.

Preferably, several and in particular two driver grooves 72 are incorporated into the inner bearing surface 66 for the necessary torque transmission between the drive shaft 52 and the assigned drive gearwheel 55, 56. The two driver grooves 72 lie diametrically opposite with respect to the longitudinal axis 54 of the drive shaft 52 and extend in a plane which coincides with the longitudinal axis 54. The longitudinal-side groove opening of each driver groove 72 follows the curvature of the spherical outer bearing surface 69.

The spherical bearing section 65 is each provided with a radially projecting driver projection 73 at peripheral regions which are diametrically opposite one another with respect to the longitudinal axis 73. Concerning the embodiment example, the driver projections 73 consist of the end sections of a rotation lock pin which are opposite one another, said rotation lock pin passing through the drive shaft 52 and the spherical bearing section 65 which is designed separately with respect to this, and projecting beyond the outer bearing surface 69 at both sides.

The driver projections 73 each engage into one of the two driver grooves 73, wherein the engagement is designed in a slidingly movable as well as rotationally movable manner.

On executing a drive rotation movement 47, 48, the driver projections 73 are impinged through the groove flanks of the driver grooves 72, so that a rotational driving of the assigned drive gearwheel 55, 56 is effected. Independently of this, each drive gearwheel 55, 56 is capable of pivoting in the course of a pivoting movement which is indicated in FIGS. 5 and 8 by a double arrow, amid the change of the inclination of the gearwheel plane 55b, 56b, wherein the driver projections 73 which are preferably contoured in a circularly cylindrical manner slide along in the respectively assigned driver groove 72 and/or are rotated with respect to this.

For changing the inclination of the gear rim plane 55b, 556b, each drive gearwheel 55, 56 is rotatable about a rotation axis which is defined by the longitudinal axes of the two driver projections 73 which are coaxial to one another. Furthermore, each drive gearwheel 55, 56 can be pivoted about a rotation axis which is at right angles to this rotation axis. Since the pivoting movements can superimpose, the gear rim plane 55b, 56b of each drive gearwheel 55, 56 can execute an inclination change similar to a swash plate.

It is to be understood that the arrangement of the driver grooves 72 and of the driver projections 73 with respect to the drive gearwheels 55, 56 and the drive shaft 52 can also be exchanged. Furthermore, the driver grooves 72 and the driver projections 73 can also be present only once per ball joint 64.

Concerning an embodiment example which is not illustrated, the mounting body 11 simultaneously defines a housing which defines the outer shape of the first joint body 2. Differing from this, with regard to the illustrated embodiment example the first joint body 2 comprises an outer housing 78 which is present additionally to the mounting body 11 and which coaxially envelops the mounting body 11 for setting the outer shaping.

By way of example, the outer housing 78 comprises two semi-shell-like housing elements 78a, 78b which are placed upon the mounting body 11 in the axis direction of the longitudinal axis 13 from two opposite sides and are fixed on the mounting body 11. Each housing element 78a, 78b has a central housing opening 79 which is coaxial to the longitudinal axis 13, so that the second joint body 3 is axially accessible from both sides and in particular can project through these housing openings 79 out of the first joint body 2.

The two cover elements 18a, 18b expediently each have an opening 19 which runs out into the ball interior 25. These openings 19 permit the leading through of energy which has already been mentioned further above.

In a manner which has not been illustrated, the joint device 1 can be provided with a sensor device, by way of which the momentary relative position between the two joint bodies 2, 3 can be detected, in order, in combination with a control of the drive devices 57 which in particular is closed-loop controlled in position, can be taken into account by the aforementioned electronic control device.

The invention claimed is:

1. A joint device, with a first joint body and with a second joint body which whilst carrying out a working pivoting movement is pivotable about a pivoting centre with respect to the first joint body and positionable in different working pivoting positions,
    wherein the first joint body defines a ball socket and the second joint body comprises a joint ball, wherein the joint ball is mounted in the ball socket rotatably about the pivoting centre for permitting the working pivoting movement of the second joint body and wherein the second joint body has an imaginary main axis which intersects the pivoting centre in each working pivoting position,
    wherein two rotatable first and second drive units are arranged on the first joint body, wherein the first drive unit can be driven into a first drive rotation movement about a first rotation axis by way of introducing a drive force into a first actuation section and wherein the second drive unit can be driven into a second drive rotation movement about a second rotation axis which is aligned at an angle with respect to the first rotation axis, by way of introducing a drive force into a second actuation section,
    wherein the first drive unit comprises a first drive gearwheel with a first drive gear rim which lies in a first gear rim plane which extends transversely to the first rotation axis and wherein the second drive unit comprises a second drive gearwheel with a second drive gear rim which lies in a second gear rim plane which extends transversely to the second rotation axis,
    wherein the joint ball of the second joint body comprises a driven toothing, with which the drive gear rims of the two drive units are in toothing engagement, in order to permit a force transmission which causes the working pivoting movement, and
    wherein the joint ball is designed as a hollow ball which encompasses a ball interior and which has a concavely curved inner peripheral surface, on which the driven toothing is formed as an inner toothing, wherein the two drive gearwheels are in toothing engagement with the driven toothing in the ball interior and wherein the two drive units can be driven independently of one another individually or simultaneously into their respective drive rotation moment for creating the working pivoting movement of the second joint body.

2. The joint device according to claim 1, wherein the first joint body has a longitudinal axis which intersects the pivoting centre, wherein given the working pivoting movement the second joint body is pivotable with respect to the first joint body in a manner such that the angle which is enclosed between the main axis and the longitudinal axis changes in magnitude.

3. The joint device according to claim 1 wherein the rotation axes of the two drive units run at right angles to one another, so that the second joint body can be driven into the working pivoting movement in a manner such that its main axis is pivotable about the pivoting centre and positionable, within a cone-shaped working region, wherein the cone tip of the cone-shaped working region coincides with the pivoting centre.

4. The joint device according to claim 1, wherein the two drive gearwheels are arranged completely in the ball interior.

5. The joint device according to claim 1, wherein each of the two drive units comprises a drive shaft which passes through the assigned drive gearwheel, is coupled to the drive gearwheel in a torque-transmitting manner and whose longitudinal axis coincides with the assigned rotation axis, wherein the drive gearwheel is pivotably mounted on the drive shaft via a ball joint in a manner such that its gear rim plane which comprises the drive gear rim can assume different inclinations with respect to the rotation axis and by way of this can follow the driven toothing which changes in its inclination given the working pivoting movement.

6. The joint device according to claim 5, wherein, for forming the ball joint which is assigned to it, each drive shaft comprises a spherical bearing section with a spherical outer bearing surface, on which bearing section the drive gearwheel is pivotably mounted with a ball-zone-shaped concave inner bearing surface, wherein at least one driver groove which extends in a plane which coincides with the longitudinal axis of the drive shaft is formed in the inner bearing surface, into which driver groove a driver projection of the spherical bearing section which projects beyond the outer bearing surface engages in a slidingly displaceable and rotatable manner, or vice versa.

7. The joint device according to claim 6, wherein each drive gearwheel consists of a sleeve-like gear rim body which comprises the drive gear rim and of two fastening rings which are inserted into the sleeve-like gear rim body in a rotationally fixed manner from sides which are axially opposite one another, wherein the two fastening rings are placed upon the spherical bearing section from axially opposite sides and each form a part-region of the concave inner bearing surface.

8. The joint device according to claim 1, wherein a first fastening interface which is designed for the external fastening of the first joint body is formed on the first joint body.

9. The joint device according to claim 1, wherein the second joint body comprises a driven section which participates in the working pivoting movement and which comprises a second fastening interface which is designed for the external fastening of the second joint body.

10. The joint device according to claim 1, wherein the concavely curved inner peripheral surface of the hollow joint ball lies on the circle line of an inner circle of the joint ball which is concentric to the pivoting centre and coincides with the main axis in a parallel position with respect to this, wherein it has a main circumferential direction which follows the circle line, wherein the driven toothing which is designed as an inner toothing comprises a multitude of teeth which are arranged successively in the main circumferential direction of the inner peripheral surface of the hollow joint ball and each have a convexly curved longitudinal extension which runs at right angles to the main circumferential direction.

11. The joint device according to claim 1, wherein the driven toothing of the joint ball has a multitude of teeth which each have a longitudinal extension which is curved in a circular-arc-shaped manner, are arranged successively in the axis direction of the main axis and are aligned such that their centres of curvature lie on the pivoting centre of the second joint body.

12. The joint device according to claim 1, wherein the driven toothing consists of at first and a second toothing section which are arranged on the joint ball in a manner offset to one another in the circumferential direction of the main axis of the second joint body, wherein the first drive gearwheel which belongs to the first drive unit is only in toothing engagement with the first toothing section and the second drive gearwheel which belongs to the second drive unit is only in toothing engagement with the second toothing section.

13. The joint device according to claim 12, wherein the two toothing sections of the driven toothing are arranged offset to one another about an arc angle of 90 degrees with respect to the main axis of the second joint body.

14. The joint device according to claim 1, wherein joint ball comprises a shell-like ball wall which encompasses a ball interior, is provided on its inner peripheral surface with the driven toothing and comprises at least one wall opening which is present in order to permit a rotation mounting of the drive units on the first joint body which encompasses the joint ball.

15. The joint device according to claim 14, wherein the ball wall comprises several wall openings which are offset to one another in the circumferential direction of the main axis, wherein each drive unit extends in the ball interior between two wall openings of the ball wall and in the region of these two wall openings is rotatably mounted on the first joint body which encompasses the joint ball.

16. The joint device according to claim 15, wherein each drive unit projects through at least one of the wall openings and is rotatably mounted on the first joint body outside the joint ball.

17. The joint device according to claim 15, wherein at least one bearing arm which belongs to the first joint body projects through one of the wall openings of the ball wall into the ball interior, wherein the two drive units are rotatably mounted on the bearing arm with an axial end section which is opposite to the actuation section.

18. The joint device according to claim 14, wherein the driven toothing consists wherein the driven toothing consists of a first and a second toothing section which are arranged on the joint ball in a manner offset to one another in the circumferential direction of the main axis of the second joint body, wherein the first drive gearwheel which belongs to the first drive unit is only in toothing engagement with the first toothing section and the second drive gearwheel which belongs to the second drive unit is only in toothing engagement with the second toothing section, wherein the two toothing sections of the driven toothing are each formed on an arcuate, web-like wall section of the ball wall which is arranged between two wall openings.

19. The joint device according to claim 1, wherein the first joint body comprises a multi-part mounting body which encompasses the joint ball and which comprises two bearing shell elements and an annular carrier element which is arranged axially between these two bearing shell elements, said bearing shell elements being arranged coaxially to one another with respect to a longitudinal axis of the first joint body which intersects the pivoting centre, wherein the two bearing shell elements each define a section of the ball socket and wherein the two drive units are rotatably mounted on the carrier element.

20. The joint device according to claim 19, wherein fastening interfaces for two drive devices which are operated electrically and/or by fluid force are arranged on the carrier element, said drive devices in the state in which they are assembled on the fastening interfaces being coupled with regard to drive to the actuation section of one of the two drive units for generating the drive rotation movements.

21. The joint device according to claim 19 wherein the first joint body comprises an outer housing which envelops the mounting body, is fastened to the mounting body and has at least one housing opening which permits the accessibility of the second joint body from the outside.

\* \* \* \* \*